(12) United States Patent
Haberman et al.

(10) Patent No.: US 10,666,949 B2
(45) Date of Patent: May 26, 2020

(54) SYSTEM AND METHOD FOR OPTIMIZED ENCODING AND TRANSMISSION OF A PLURALITY OF SUBSTANTIALLY SIMILAR VIDEO FRAGMENTS

(71) Applicant: Visible World, LLC, Philadelphia, PA (US)

(72) Inventors: Seth Haberman, New York, NY (US); Gerrit Niemeijer, Maplewood, NJ (US); Richard L. Booth, Bensalem, PA (US); Alex Jansen, Miami, FL (US)

(73) Assignee: VISIBLE WORLD, LLC, Philadelphia, PA (US)

( * ) Notice: Subject to any disclaimer, the term of this patent is extended or adjusted under 35 U.S.C. 154(b) by 0 days.

(21) Appl. No.: 15/856,171

(22) Filed: Dec. 28, 2017

(65) Prior Publication Data

US 2018/0124410 A1 May 3, 2018

Related U.S. Application Data

(63) Continuation of application No. 15/155,827, filed on May 16, 2016, which is a continuation of application No. 13/455,836, filed on Apr. 25, 2012, now Pat. No. 9,344,734, which is a continuation of application No. 10/991,674, filed on Nov. 18, 2004, now Pat. No. 8,170,096.

(60) Provisional application No. 60/523,035, filed on Nov. 18, 2003.

(51) Int. Cl.
*H04N 19/152* (2014.01)
*H04N 19/513* (2014.01)
*H04N 19/30* (2014.01)
*H04N 19/114* (2014.01)
*H04N 19/174* (2014.01)
*H04N 19/40* (2014.01)
*H04N 19/124* (2014.01)
*H04N 19/176* (2014.01)

(52) U.S. Cl.
CPC ......... *H04N 19/152* (2014.11); *H04N 19/114* (2014.11); *H04N 19/124* (2014.11); *H04N 19/174* (2014.11); *H04N 19/176* (2014.11); *H04N 19/30* (2014.11); *H04N 19/40* (2014.11); *H04N 19/513* (2014.11)

(58) Field of Classification Search
CPC combination set(s) only.
See application file for complete search history.

(56) References Cited

U.S. PATENT DOCUMENTS

| | | | |
|---|---|---|---|
| 3,366,731 A | 1/1968 | Wallerstein | |
| 3,639,686 A | 2/1972 | Walker et al. | |
| 4,331,974 A | 5/1982 | Cogswell et al. | |
| 4,475,123 A | 10/1984 | Dumbauld et al. | |
| 4,573,072 A | 2/1986 | Freeman | |
| 4,602,279 A | 7/1986 | Freeman | |
| 4,625,235 A | 11/1986 | Watson | |
| 4,638,359 A | 1/1987 | Watson | |
| 4,703,423 A | 10/1987 | Bado et al. | |
| 4,716,410 A | 12/1987 | Nozaki | |
| 4,789,235 A | 12/1988 | Borah et al. | |

(Continued)

*Primary Examiner* — Janese Duley
(74) *Attorney, Agent, or Firm* — BakerHostetler

(57) ABSTRACT

A system and method for stitching separately encoded MPEG video fragments, each representing a different rectangular area of the screen together into one single full-screen MPEG encoded video fragment.

18 Claims, 4 Drawing Sheets

(56) References Cited

U.S. PATENT DOCUMENTS

| | | |
|---|---|---|
| 4,814,883 A | 3/1989 | Perine et al. |
| 4,847,698 A | 7/1989 | Freeman |
| 4,847,699 A | 7/1989 | Freeman |
| 4,847,700 A | 7/1989 | Freeman |
| 4,850,007 A | 7/1989 | Marino et al. |
| 4,918,516 A | 4/1990 | Freeman |
| 5,099,422 A | 3/1992 | Foresman et al. |
| 5,105,184 A | 4/1992 | Pirani et al. |
| 5,155,591 A | 10/1992 | Wachob |
| 5,173,900 A | 12/1992 | Miller et al. |
| 5,220,501 A | 6/1993 | Lawlor et al. |
| 5,231,494 A | 7/1993 | Wachob |
| RE34,340 E | 8/1993 | Freeman |
| 5,253,940 A | 10/1993 | Abecassis |
| 5,260,778 A | 11/1993 | Kauffman et al. |
| 5,291,395 A | 3/1994 | Abecassis |
| 5,305,195 A | 4/1994 | Murphy |
| 5,343,239 A | 8/1994 | Lappington et al. |
| 5,347,632 A | 9/1994 | Filepp et al. |
| 5,356,151 A | 10/1994 | Abecassis |
| 5,361,393 A | 11/1994 | Rossillo |
| 5,377,354 A | 12/1994 | Scannell et al. |
| 5,414,455 A | 5/1995 | Hooper et al. |
| 5,422,468 A | 6/1995 | Abecassis |
| 5,424,770 A | 6/1995 | Schmelzer et al. |
| 5,426,281 A | 6/1995 | Abecassis |
| 5,434,678 A | 7/1995 | Abecassis |
| 5,442,390 A | 8/1995 | Hooper et al. |
| 5,442,771 A | 8/1995 | Filepp et al. |
| 5,446,919 A | 8/1995 | Wilkins |
| 5,448,568 A | 9/1995 | Delpuch et al. |
| 5,499,046 A | 3/1996 | Schiller et al. |
| 5,515,098 A | 5/1996 | Carles |
| 5,515,270 A | 5/1996 | Weinblatt |
| 5,519,433 A | 5/1996 | Lappington et al. |
| 5,526,035 A | 6/1996 | Lappington et al. |
| 5,537,141 A | 7/1996 | Harper et al. |
| 5,548,532 A | 8/1996 | Menand et al. |
| 5,550,735 A | 8/1996 | Slade et al. |
| 5,566,353 A | 10/1996 | Cho et al. |
| 5,584,025 A | 12/1996 | Keithley et al. |
| 5,585,838 A | 12/1996 | Lawler et al. |
| 5,585,858 A | 12/1996 | Harper et al. |
| 5,594,910 A | 1/1997 | Filepp et al. |
| 5,610,653 A | 3/1997 | Abecassis |
| 5,617,142 A | 4/1997 | Hamilton |
| 5,632,007 A | 5/1997 | Freeman |
| 5,634,849 A | 6/1997 | Abecassis |
| 5,636,346 A | 6/1997 | Saxe |
| 5,638,113 A | 6/1997 | Lappington et al. |
| 5,652,615 A | 7/1997 | Bryant et al. |
| 5,671,225 A | 9/1997 | Hooper et al. |
| 5,682,196 A | 10/1997 | Freeman |
| 5,684,918 A | 11/1997 | Abecassis |
| 5,696,869 A | 12/1997 | Abecassis |
| 5,717,814 A | 2/1998 | Abecassis |
| 5,717,923 A | 2/1998 | Dedrick |
| 5,724,091 A | 3/1998 | Freeman et al. |
| 5,724,472 A | 3/1998 | Abecassis |
| 5,724,521 A | 3/1998 | Dedrick |
| 5,734,413 A | 3/1998 | Lappington et al. |
| 5,740,388 A | 4/1998 | Hunt |
| 5,740,549 A | 4/1998 | Reilly et al. |
| 5,754,939 A | 5/1998 | Herz et al. |
| 5,758,259 A | 5/1998 | Lawler |
| 5,761,601 A | 6/1998 | Nemirofsky et al. |
| 5,764,275 A | 6/1998 | Lappington et al. |
| 5,768,521 A | 6/1998 | Dedrick |
| 5,774,170 A | 6/1998 | Hite et al. |
| 5,774,664 A | 6/1998 | Hidary et al. |
| 5,778,181 A | 7/1998 | Hidary et al. |
| 5,784,095 A | 7/1998 | Robbins et al. |
| 5,784,528 A | 7/1998 | Yamane et al. |
| 5,796,945 A | 8/1998 | Tarabella |
| 5,802,314 A | 9/1998 | Tullis et al. |
| 5,805,974 A | 9/1998 | Hite et al. |
| 5,815,604 A * | 9/1998 | Simons ............... H04N 5/262 348/E5.051 |
| 5,825,884 A | 10/1998 | Zdepski et al. |
| 5,835,087 A | 11/1998 | Herz et al. |
| 5,861,881 A | 1/1999 | Freeman et al. |
| 5,867,208 A | 2/1999 | McLaren |
| 5,873,068 A | 2/1999 | Beaumont et al. |
| 5,887,243 A | 3/1999 | Harvey et al. |
| 5,903,263 A | 5/1999 | Emura |
| 5,907,837 A | 5/1999 | Ferrel et al. |
| 5,913,031 A | 6/1999 | Blanchard |
| 5,917,830 A | 6/1999 | Chen et al. |
| 5,929,850 A | 7/1999 | Broadwin et al. |
| 5,931,901 A | 8/1999 | Wolfe et al. |
| 5,937,331 A | 8/1999 | Kalluri et al. |
| 5,949,951 A | 9/1999 | Sklar et al. |
| 5,978,799 A | 11/1999 | Hirsch |
| 5,986,692 A | 11/1999 | Logan et al. |
| 5,989,692 A | 11/1999 | Brown |
| 5,991,735 A | 11/1999 | Gerace |
| 6,002,393 A | 12/1999 | Hite et al. |
| 6,009,409 A | 12/1999 | Adler et al. |
| 6,018,768 A | 1/2000 | Ullman et al. |
| 6,026,368 A | 2/2000 | Brown et al. |
| 6,029,045 A | 2/2000 | Picco et al. |
| 6,038,000 A | 3/2000 | Hurst, Jr. |
| 6,038,367 A | 3/2000 | Abecassis |
| 6,049,569 A | 4/2000 | Radha et al. |
| 6,067,348 A | 5/2000 | Hibbeler |
| 6,075,551 A | 6/2000 | Berezowski et al. |
| 6,078,619 A | 6/2000 | Monro et al. |
| 6,094,455 A * | 7/2000 | Katta ............... H04N 19/159 348/419.1 |
| 6,108,486 A | 8/2000 | Sawabe et al. |
| 6,137,834 A | 10/2000 | Wine et al. |
| 6,141,358 A | 10/2000 | Hurst et al. |
| 6,160,570 A | 12/2000 | Sitnik |
| 6,304,852 B1 | 10/2001 | Loncteaux |
| 6,327,574 B1 | 12/2001 | Kramer et al. |
| 6,330,286 B1 | 12/2001 | Lyons et al. |
| 6,343,287 B1 | 1/2002 | Kumar et al. |
| 6,357,042 B2 | 3/2002 | Srinivasan et al. |
| 6,360,234 B2 | 3/2002 | Jain et al. |
| 6,400,886 B1 * | 6/2002 | Brewer ............... G11B 27/036 386/281 |
| 6,408,278 B1 | 6/2002 | Carney et al. |
| 6,411,992 B1 | 6/2002 | Srinivasan et al. |
| 6,421,386 B1 | 7/2002 | Chung et al. |
| 6,424,991 B1 | 7/2002 | Gish |
| 6,449,657 B2 | 9/2002 | Stanbach et al. |
| 6,457,010 B1 | 9/2002 | Eldering et al. |
| 6,463,441 B1 | 10/2002 | Jain et al. |
| 6,463,585 B1 | 10/2002 | Hendricks et al. |
| 6,466,975 B1 | 10/2002 | Sterling |
| 6,502,076 B1 | 12/2002 | Smith |
| 6,529,550 B2 | 3/2003 | Tahara et al. |
| 6,567,980 B1 | 5/2003 | Jain et al. |
| 6,574,008 B1 | 6/2003 | Yokose et al. |
| 6,574,793 B1 | 6/2003 | Ngo et al. |
| 6,588,013 B1 | 7/2003 | Lumley et al. |
| 6,601,237 B1 | 7/2003 | Ten et al. |
| 6,611,624 B1 | 8/2003 | Zhang et al. |
| 6,671,880 B2 | 12/2003 | Shah-Nazaroff et al. |
| 6,678,332 B1 | 1/2004 | Gardere et al. |
| 6,681,395 B1 | 1/2004 | Nishi |
| 6,694,482 B1 | 2/2004 | Arellano et al. |
| 6,698,020 B1 | 2/2004 | Zigmond et al. |
| 6,735,628 B2 | 5/2004 | Eyal |
| 6,785,289 B1 | 8/2004 | Ward et al. |
| 6,806,909 B1 | 10/2004 | Radha et al. |
| 6,850,252 B1 | 2/2005 | Hoffberg |
| 6,857,024 B1 | 2/2005 | Chen et al. |
| 6,877,134 B1 | 4/2005 | Fuller et al. |
| 6,956,600 B1 | 10/2005 | Gaylord |
| 7,170,938 B1 | 1/2007 | Cote et al. |
| 7,308,028 B2 | 12/2007 | Suh |
| 7,469,007 B2 | 12/2008 | Tahara et al. |
| 8,170,096 B1 | 5/2012 | Haberman et al. |

(56) References Cited

U.S. PATENT DOCUMENTS

| | | |
|---|---|---|
| 8,696,869 B2 | 4/2014 | Borkar et al. |
| 2001/0013124 A1 | 8/2001 | Klosterman et al. |
| 2002/0026359 A1 | 2/2002 | Long et al. |
| 2002/0056093 A1 | 5/2002 | Kunkel et al. |
| 2002/0057336 A1 | 5/2002 | Gaul et al. |
| 2002/0083443 A1 | 6/2002 | Eldering et al. |
| 2002/0083448 A1 | 6/2002 | Johnson |
| 2002/0092017 A1 | 7/2002 | Klosterman et al. |
| 2002/0095676 A1 | 7/2002 | Knee et al. |
| 2002/0154694 A1* | 10/2002 | Birch ............... H04B 7/2612 375/240.05 |
| 2003/0110500 A1 | 6/2003 | Rodriguez |
| 2003/0121037 A1 | 6/2003 | Swix et al. |
| 2003/0133512 A1 | 7/2003 | Moni et al. |
| 2003/0177503 A1 | 9/2003 | Sull et al. |
| 2003/0202124 A1* | 10/2003 | Alden ............... H04N 5/272 348/722 |
| 2004/0025180 A1 | 2/2004 | Begeja et al. |
| 2004/0105492 A1 | 6/2004 | Goh et al. |
| 2004/0111742 A1 | 6/2004 | Hendricks et al. |
| 2004/0136698 A1 | 7/2004 | Mock |
| 2005/0086691 A1 | 4/2005 | Dudkiewicz et al. |
| 2005/0086692 A1 | 4/2005 | Dudkiewicz et al. |
| 2005/0166224 A1 | 7/2005 | Ficco |
| 2007/0002946 A1 | 1/2007 | Bouton et al. |
| 2010/0232504 A1* | 9/2010 | Feng ............... H04N 19/176 375/240.13 |

\* cited by examiner

SYSTEM AND METHOD FOR OPTIMIZED ENCODING AND TRANSMISSION OF A PLURALITY OF SUBSTANTIALLY SIMILAR VIDEO FRAGMENTS

CROSS REFERENCE TO RELATED APPLICATIONS

This application is a continuation of U.S. patent application Ser. No. 15/155,827, filed on May 16, 2016, which is a continuation of U.S. patent application Ser. No. 13/455,836 filed on Apr. 25, 2012, which is a continuation of Ser. No. 10/991,674 filed on Nov. 18, 2004, now U.S. Pat. No. 8,170,096, which issued on May 1, 2012, which claims the benefit of U.S. Provisional Patent Application No. 60/523,035, filed on Nov. 18, 2003, the contents of which are incorporated by reference herein in their entirety.

FIELD OF THE INVENTION

This invention is directed towards digital compressed video, and more particularly towards a method for merging separately encoded MPEG video segments into a single full-screen encoded MPEG video segment.

BACKGROUND

Current electronic distribution of television messages, such as commercials, from an originator or distributor to one or more television broadcast stations and/or cable television master control centers, does not easily allow for regional customization of such messages. The reason for this is that each different variant of a message has to be transmitted completely by itself, and independent from the other variants, from sender to receiver. Each extra variant will thus require proportionally extra bandwidth usage over the transmission channel. Sending fifty different variants will require fifty times as much bandwidth as sending one single variant. This added bandwidth consumption would be prohibitively costly and/or time consuming.

Regional customization of television messages would be desirable, for example, in the distribution of infomercials. An infomercial is a television commercial with the specific purpose of getting the viewer to pickup the phone and order the advertised product immediately. Typically, there are two types of infomercials: Long form messages (paid programming), having a length of (approx.) 30 minutes, and short form messages (direct response ads, aired in the space of normal commercials), having a length of 30-120 sec.

A typical infomercial (just like any other television commercial) is broadcast in many different geographic regions from many different (easily 50 or more) broadcast stations. To measure the effectiveness of the commercial in the different regions it would be advantageous to have a different call-in phone number in use for the commercial in each region. Typically, such phone numbers to be called by the viewer are overlaid over a small portion, typically the bottom, of the video for the entire duration (or large portions) of the commercial.

Regional customization of television messages would also be advantageous, for instance, in the case of a commercial for a brand or chain that has many stores throughout the country. Commercials for the brand could be regionalized by showing the address of the nearest store for that brand, by showing different promotions for different products for each region, by showing different prices for the same product in different regions, etc. Such region-specific customizations could be added to small portions of the video of the commercial, for example as (but not limited to) a text overlay.

The above examples have in common that, a small portion of the video is varying between the different versions of the message, while larger portions of the video are common between many versions. Therefore it would be advantageous if there was a method to independently encode and distribute different portions of the screen, to exploit the different amounts of variation for different portions of the screen, and thus achieve a saving in required transmission bandwidth. An additional advantage would be reduced encoding and decoding time since the amount of video to be encoded and decoded would be less.

However, television commercials are currently mainly distributed in MPEG-2 format. Unfortunately, the MPEG-2 video compression standard as well as existing MPEG-2 encoding and decoding equipment do not allow for independent encoding, decoding, and/or assembly into full screen video, of different portions of the video screen.

SUMMARY

"Video stitching" is a solution to the problem of how to efficiently encode, bundle, and assemble many different variants of a single piece of digital video, where certain (preferably small) rectangular parts of the screen can be identified as containing a lot of variations, and the remaining, preferably large, rectangular portion(s) of the screen are invariant (or have very little variation) across all versions of the video.

In a situation where only parts of the video, for instance the bottom, are different over all variants, it is advantageous to encode only one copy of the (common) top of the screen and 10 multiple different copies of the bottom of the screen than to encode each full-screen variant, At the receiving end, a video stitching system would be used to reconstruct any desired variant. Savings will be made both in speed of encoding, decoding, and size of the complete package with all variants.

An illustrative embodiment of the present invention includes a method of encoding partial-frame video segments, the method including dividing the full-video frame area into rectangular regions, wherein the rectangular regions have a length and width that are each a multiple of 16 pixels. Then upon obtaining video segments for at least one of the rectangular regions, the method includes determining a target VBV buffer size for the video segments for a selected rectangular region, and then encoding the video segments for the selected rectangular region using the determined target VBV buffer size. Preferably, a common GOP pattern is used for encoding all video segments for all of the rectangular regions.

The step of determining a target VBV buffer size includes selecting a target VBV buffer size that is substantially proportional to a full frame VBV buffer size based on relative size of the rectangular region as compared to a full frame size. Alternatively a target VBV buffer size is selected that is smaller than a value that is substantially proportional to a full frame VBV buffer size based on relative size of the rectangular region as compared to a full frame size. The method also includes determining a VBV bit rate for encoding the video segments for the selected rectangular region, wherein the VBV bit rate is selected that is substantially proportional to a full frame VBV bit rate based on relative size of the rectangular region as compared to a full frame size. Alternatively, a VBV bit rate is selected that is smaller than a value that is substantially proportional to a full frame VBV bit rate based on relative size of the rectangular region as compared to a full frame size.

The illustrative embodiment also includes determining f-code array values for the video segments, after encoding the video segments, modifying the f-code array values and motion vectors for the encoded video according to the determined f-code array values. The f-code array values are determined by using the maximum values for the f-code array values from the plurality of video segments.

The illustrative embodiment also includes assembling a row of encoded video segment macroblocks into a slice, wherein header information for each macroblock in the slice is modified for a proper format for a complete slice.

The method also includes obtaining a plurality of different video segments for the rectangular region, wherein the different video segments are then merged with other video segments for other rectangular regions to create multiple different full-video frame video segments.

The present invention also includes an encoding system for encoding partial-frame video segments to allow different partial-frame video segments to be merged into a full-video frame.

The savings in overall package size as provided by the present invention is important, for instance, in situations of satellite (multicast/broadcast) distribution of the entire package from the originator to the local broadcast stations. Each local station has to extract the desired variant from the package. This is shown in FIG. 2. Large savings in the size of the package to be distributed will make it commercially feasible to have many different variants of the infomercial.

Even in the case of (unicast) distribution of the entire package from a single originator to a single intermediate distribution point (such as a cable television local advertising master control center) the savings in bandwidth between originator and distribution point will allow for major cost and time savings.

It is important to note that Video Stitching as described in the present invention is very different from other object-based compressed video technologies (such as MPEG-4) since the order of decoding and composing (stitching) the individual segments is reversed. In MPEG-4, the video decoder first decodes the various encoded video segments, and then composes the resulting uncompressed segments (typically on-the-fly) into full screen video. In the proposed video stitching method, the compressed segments are first stitched together into a full-screen compressed segment which is subsequently decoded.

Another difference between the present invention and other object-based video compression methods such as MPEG-4 is that Video Stitching as described integrates naturally with existing MPEG-2 decoding equipment deployed in, for example, cable television headends and broadcast television stations. To support video stitching in such environments would mean that the individually encoded MPEG video segments are stitched together just after reception at the point of decoding. Decoding itself will not change since the Video Stitcher will produce the same type of (MPEG-2) streams that are currently handled by such systems. As a comparison, using MPEG-4 would mean that a transcoder from MPEG-4 to MPEG-2 is needed at the point of reception to be able to reuse the existing MPEG-2 decoders, which is disadvantageous. Another option would be replacing the existing MPEG-2 decoders with MPEG-4 decoders which is disadvantageous from a cost perspective.

Note that the present invention will work with videos of any resolution, and is not restricted to just NTSC or PAL. Any resolution that is legal under MPEG is supported.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

A method of creating personalized messages that can be used for regionally, or even personalized, targeting based on variations in the commercial is described in co-pending U.S. patent application Ser. No. 09/545,015 filed on Apr. 7, 2000 and incorporated herein by reference. The present invention is directed towards variations between video and commercials based on differences that are confined to certain portions of the screen.

The present invention finds utility in various data transmission applications including, but not limited to, encoding, transmission, reception and decoding of digital compressed video, regardless of the means of transmission.

Figure 1:
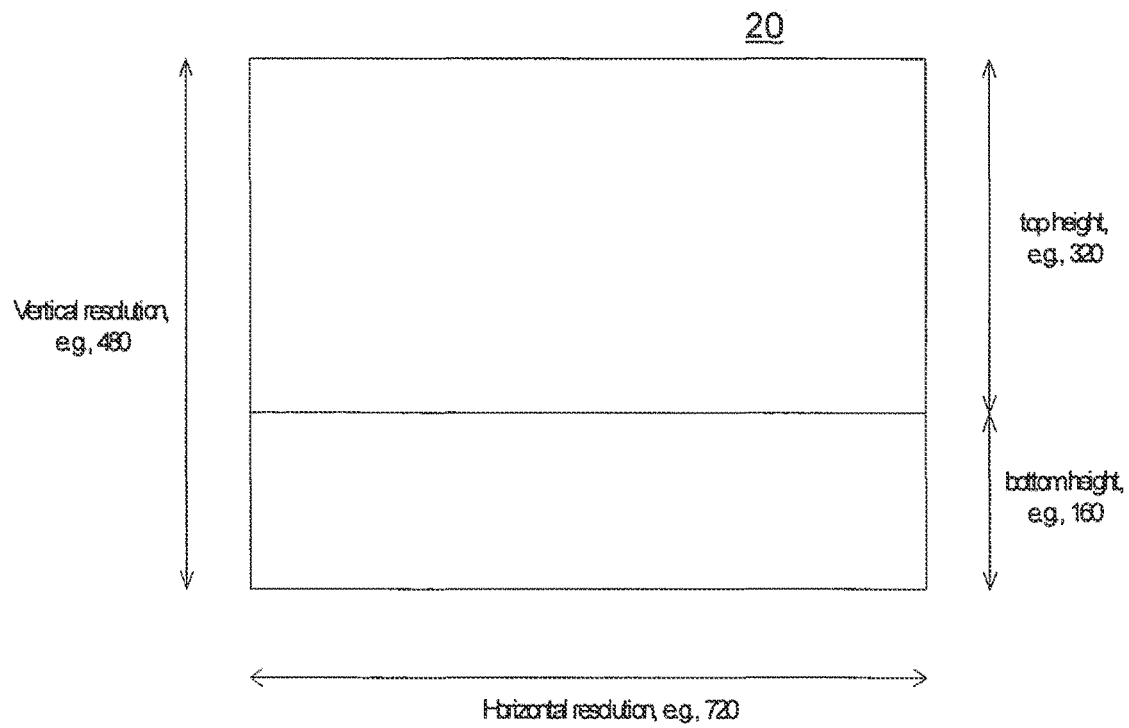
FIG. 1 illustrates a video segment split-up in a top and bottom region.

An application of an illustrative embodiment is shown in FIG. 1. A piece of video 20 is to be created of which fifty variations must be made, each with a different 1-800-number, promotion code, or any other piece of information in the bottom $\frac{1}{3}^{rd}$ of the screen. The final videos have to be encoded in MPEG-2, have a total resolution of 720×480 (NTSC) and a bitrate of 4,500,000 bps. The top video will have a resolution of 720×320 and an encoding bitrate of 3,000,000 bps. The bottom video will have a resolution of 720×160 and an encoding bitrate of 1,500,000 bps, leading to the desired merged resolution and bitrate. Typical MPEG VBV buffer size values will be 140 Kbyte for the top and 70 Kbyte for the bottom (leading to a an overall VBV buffer size after merging below the maximum of 224 Kbyte).

Now, assuming a thirty minute message, fifty completely encoded variants would require a total storage capacity (and transmission bandwidth) of (30×60×4.5×50)/(8×1024)=50 Gbyte, Separate encoding of the single top section and the 50 different bottom sections will only require (30×60×(3+1.5×50))/(8×1024)=17 Gbyte, which represents a reduction in size of a factor 3 (34% of the full size).

In situations where the bottom section is smaller and/or the amount of different variants is larger the savings will increase even more dramatically. For example, a bottom section of $\frac{1}{5}^{th}$ of the screen size and a total of 100 variants will lead to a size of 100 Gbyte for encoding of each full variants, and 30×60×4.5×(⅘+⅕×100)/(8×1024)=20.5 Gbyte for separate encoding of the top part and the bottom parts. This reflects a reduction by a factor of 5 (20% of the fall size).

Figure 5:
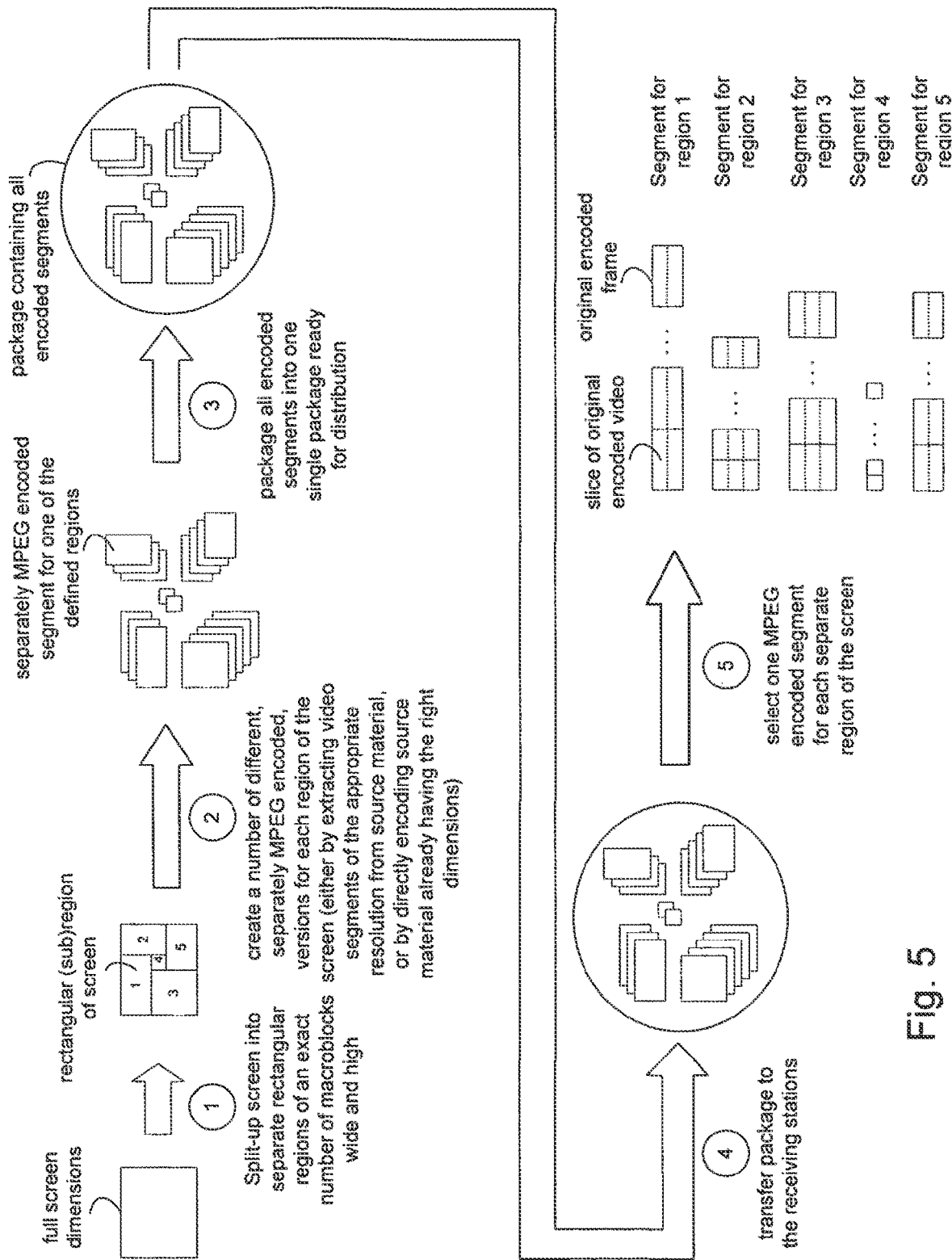
FIG. 5 illustrates part of preparing stitchable video segments and stitching them together into valid MPEG, according to an illustrative embodiment.
Figure 6:
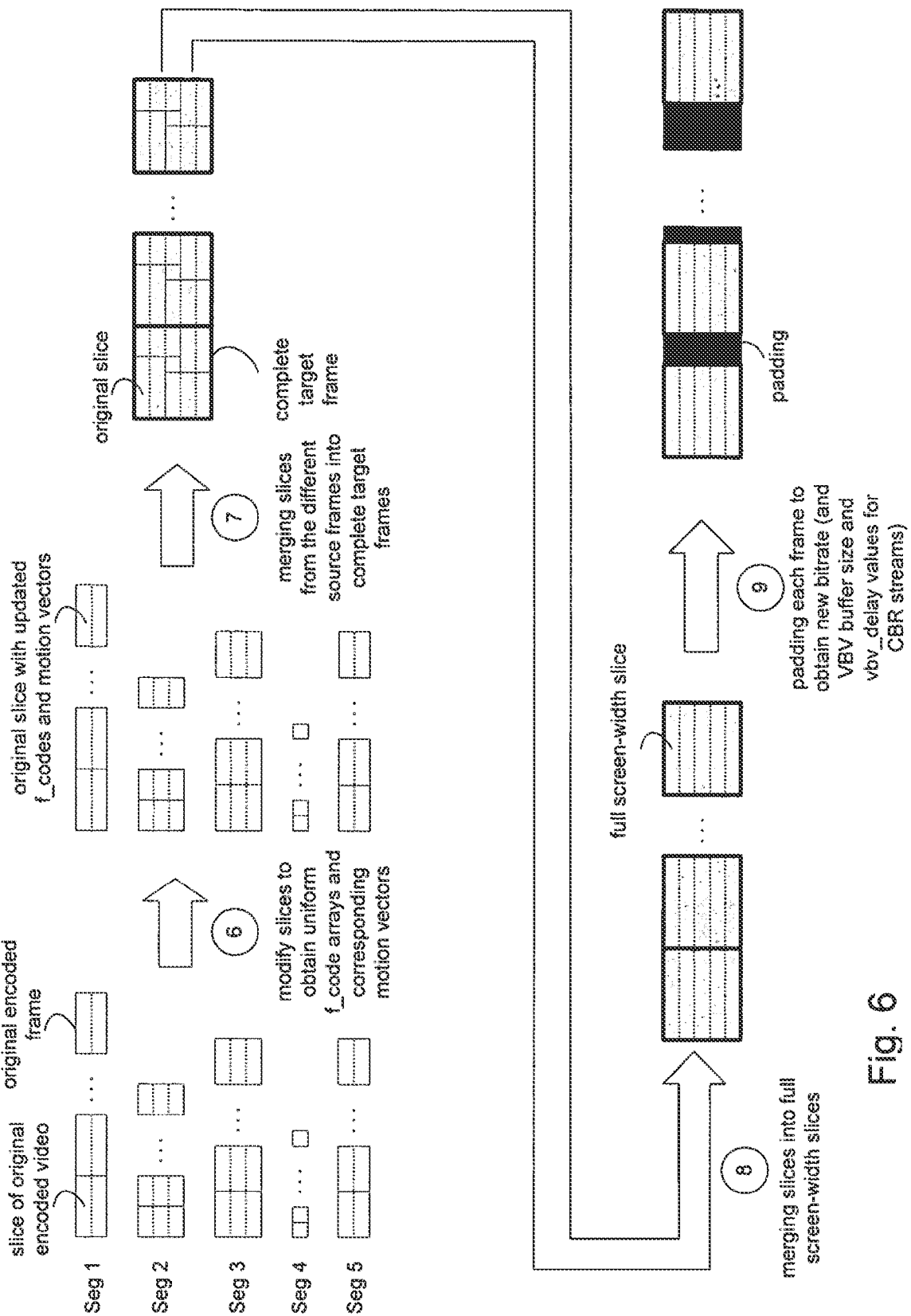
FIG. 6 illustrates another part of preparing stitchable video segments and stitching them together into valid MPEG according to an illustrative embodiment.

FIGS. 5 and 6 describe the various steps in preparing stitchable video segments, and stitching such video segments together into full-screen segments. Throughout the following text references will be made to the steps shown in these pictures as further illustration of the present invention.

A first aspect of the present invention is how to encode the video to make it suitable for stitching at a later point in time. One possibility is to encode all variant commercials in their full-screen entirety, and then post-process them into the separate parts. This has proven to be not practical because MPEG motion vectors allow video at any given point on the screen to "migrate" to other parts of the screen over time (the duration of a GOP (Group of Pictures) is typically half a second), and it cannot easily be guaranteed that changes in the variable part of the screen won't end up in the invariant part, causing a visible video glitch.

A workable solution according to the present invention is to encode the separate rectangular parts (2 or more) of the video fully independent from each other. Each part would represent a rectangular region of the screen. Each such region is a multiple of 16 pixels high and a multiple of 16 pixels wide and thus correspond to an integral number of MPEG macroblocks. All rectangular regions together would precisely cover the entire screen 20 (without overlaps). An NTSC picture, for example, is 720 pixels wide and 480 pixels high, corresponding to 45 macroblocks wide and 30 macroblocks high. One can, for instance, encode the top 25 rows as the invariant part of the picture and make multiple versions of the bottom 5 rows to be stitched together with the top 25.

Figure 3:
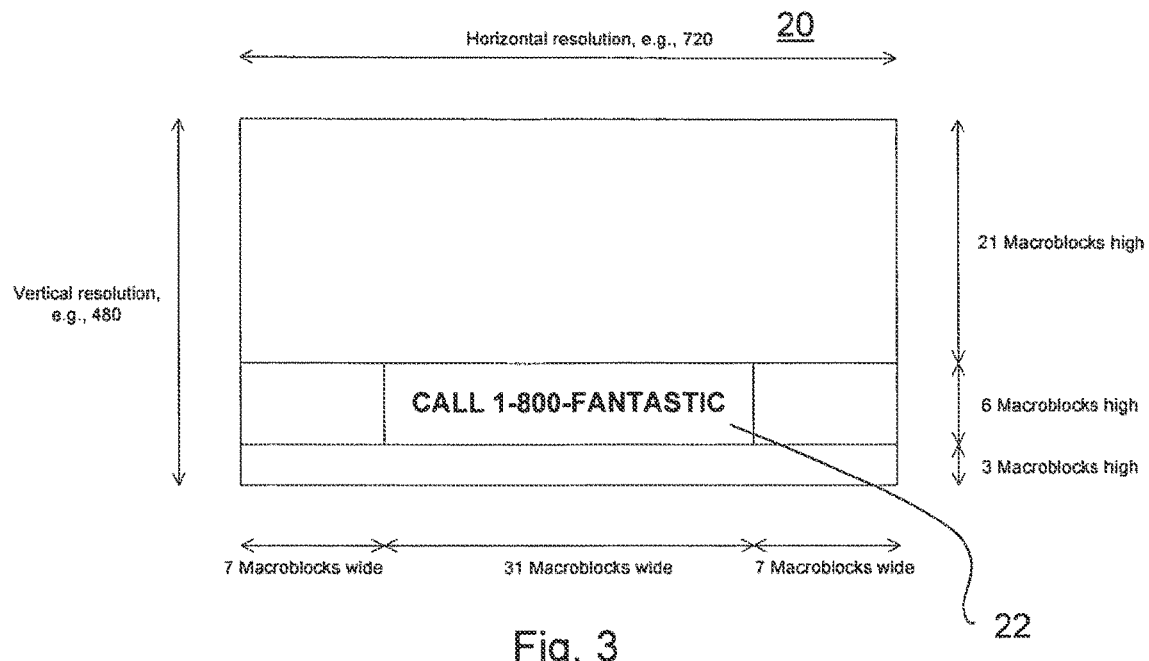
FIG. 3 illustrates a video segment split-up into five different rectangular regions.
Figure 4:
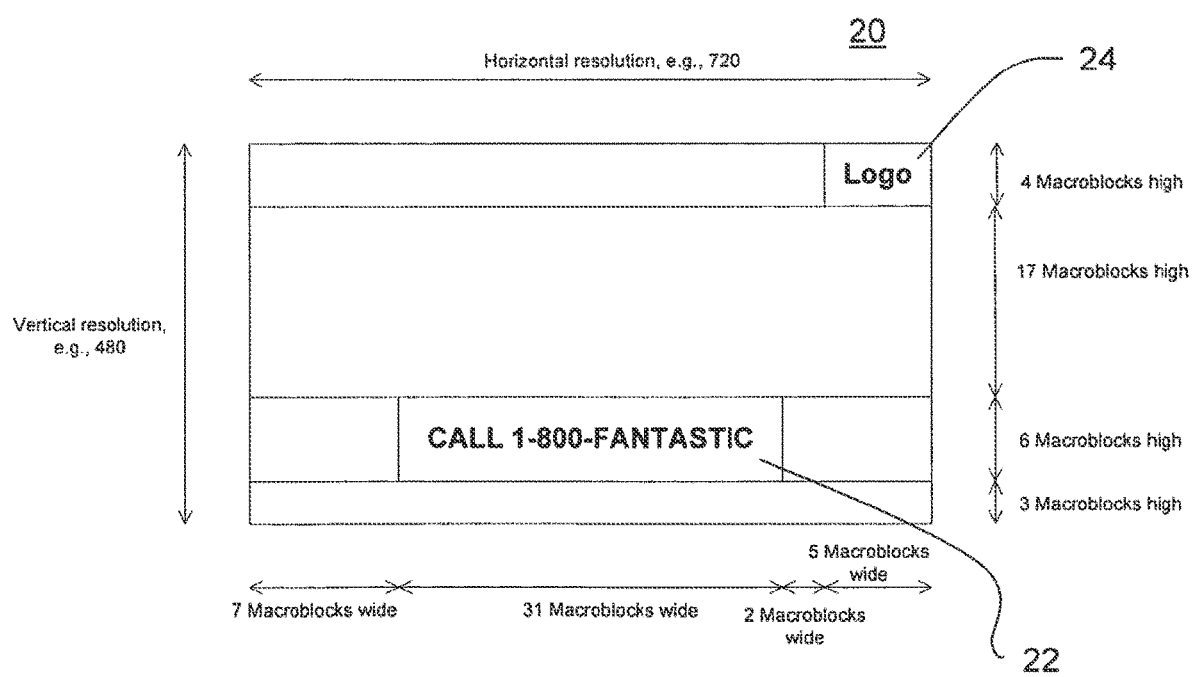
FIG. 4 illustrates a video segment split-up into seven different rectangular regions.

More complicated situations are shown in FIGS. 3 and 4, where the screen is split-up into five and seven rectangular regions respectively, each an exact multiple of 16 pixels wide and high. In FIG. 3 there is one region 22 of the screen variable (with a call to action). In FIG. 4 there is an additional logo 24 on the top right hand corner that is variable.

By running the rectangular regions of the picture through an encoder separately, the present invention guarantees that motion vector "crosstalk" between the different segments will not occur.

FIG. 5 shows the steps according to an illustrative embodiment. At step 1, is the step of determining on the different screen regions, as previously described. For this example, there are five different regions. At step 2, the video for each region is created or extracted from source material of other dimensions, as is well known in the art. If the source material is already of the right dimensions, it can be encoded directly. All the segments (including variations) are then encoded, and then packaged for delivery, step 3. The packaging may include all segments, or be divided up by delivery area or other parameters. The package is then transferred to the receiving station by any type of transmission, step 4. The receiving station can be a head end, set top box, or other place where the segments will be assembled. The proper segments are selected, and assembled, or stitched, into the appropriate full screen size, step 5. Details for this process are provided below.

Enabling efficient stitching of separately-encoded pieces of video according to the illustrative embodiment utilizes several steps during encoding, step 2 FIG. 5. A first requirement on the separately encoded videos is that they must maintain exactly identical GOP patterns. For instance, an IPBBPBBPBBPBB segment can't be stitched together with an IPBPBPBPBPBPB segment. Even though the number of frames is the same in these GOPs, the differing patterns preclude stitching because a resultant frame can't think of itself as part P (Interframe or forward prediction frame) and part B (bi-directional predicted frame) at the same time. Stitching such videos together would effectively mean decoding and subsequently reencoding the video at the point of reception, thus defeating the purpose.

When encoding the rectangular regions according to the illustrative embodiment, it is beneficial for VBV buffer size and bitrate for each region to be chosen in approximate proportion to the relative sizes of the regions. For example, in a two region situation, as shown in FIG. 1, if one region takes 90% of the area, it should use about 90% of the intended final VBV buffer size, while the other region should get 10% or so of each. It is furthermore important to note, as will be explained below, that stitching will typically result in some data expansion, so the VBV sizes and bitrates actually chosen for encoding should be slightly smaller than the ones that are computed based only on the proportion of the relative region sizes, applied to the fixed desired VBV buffer size and bitrate. In practice, this means a slight reduction by a fixed factor, usually between 10% and 15%, for each segment. For example, for a VBV buffer size of 224 Kbyte and a bitrate of 6000000 bits/sec, the sum of the two parts should be about 200 Kbyte for the VBV buffer and about 5400000 bits/sec, for the bitrate.

Another typical requirement for encoding "stitchable" video segments according to the illustrative embodiment is that the global stream parameters that control macroblock decoding should be identical across clips. In particular, the optional quantization matrices included in sequence headers should be the same, as well as any quantization matrix extensions present. Several fields of the picture coding extension should also agree across clips, most importantly, the alternate_scan bit, the intra_dc_precision value, and the f_code 4-value array. Most encoders presently used in the industry usually either pick fixed values for these fields, or they can be instructed to use certain fixed values. The exception to this is the 4-value f_code array which governs the decoding of motion vectors.

The f_code array contains four elements: one each for forward horizontal motion, forward vertical motion, backward horizontal motion, and backward vertical motion. Only B frames actually use all four. P frames only use the forward components. I frames (Intraframes) don't use them at all.

The values in the f code array reflect the "worst case" motion vectors found in the associated image. A picture with a lot of large-scale gross motion in it relative to its predecessor picture tends to have larger maximum motion vector sizes than a relatively static picture. Bigger motion vectors are reflected in bigger f_code values, which basically control the number of bits used to express motion vectors in the picture. In order to perform video stitching, the f_code values of the video frames that must be stitched together must be modified so that they are consistent. Subsequently, according to the illustrative embodiment, the motion vectors that are expressed in terms of these f_codes reencoded to match the new f_codes. An advantage is that any given motion vector can be re-encoded for a larger f_code value, but not necessarily for a smaller f_code value. Therefore, to be able to stitch two or more video frames together, the illustrative embodiment defines the f_code values for the stitched frame to be at least the maximum of the alternatives for any f_code array component. After thus determining the new f_code for the stitched frame, the motion vectors of each frame are reencoded in terms of the new f_codes. This reencoding always typically involves some data expansion, but practice has shown it is often in the order of just 1%.

Figure 2:
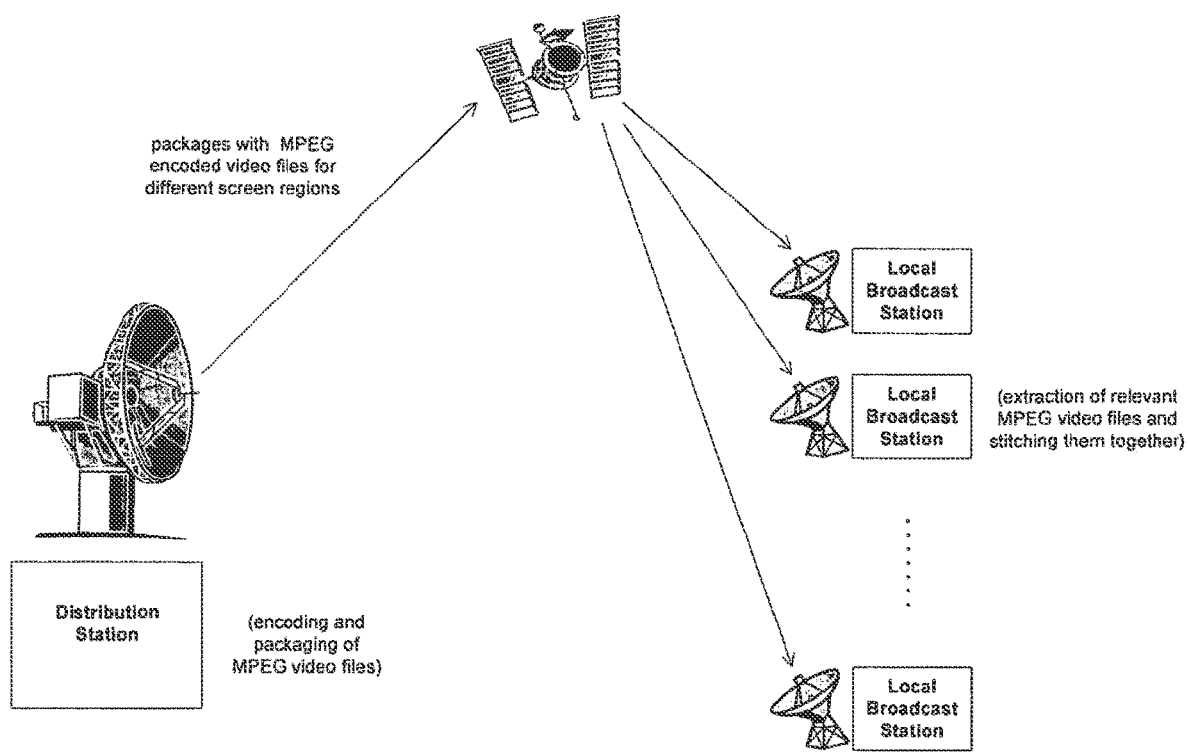
FIG. 2 illustrates a satellite broadcast of a package consisting of a single top video file and multiple bottom video files.

According to the illustrative embodiment, there are two options to modifying f_code values and reencoding motion vectors to make video fragments stitchable. The first option is to make this part of the actual stitching process, i.e., in the local stations or set top boxes as shown in FIG. 2. The advantage of this approach is that the package that has to be transmitted as small as possible, leading to a saving in bandwidth. However, this means that the stitching work in the local station is more complex, since all the f_code modification and motion-vector reencoding has to be done locally.

The second option is to find the maximum f_code values for a given frame across all variants and modify all the variants (i.e., reencode the motion vectors) for this maximum f_code array before packaging for distribution. This will simplify the stitching process in the local station at the expense of needing more bandwidth, and leading to slightly larger (1% or so) stitched videos (since the max. f_code is computed across all variants, and not on a per variant basis).

FIG. 5 illustrates the first option, i.e., packaging the video directly after encoding, and modifying f_codes and motion vectors after distribution. Step 3 illustrates the packaging of the separately encoded segments into a single package. Step 4 illustrates the distribution of that package (using any available transmission mechanism). Step 5 shows the selection, at the reception point, of a set of segments (one for each region) to be stitched together. Step 6 in FIG. 6 illustrates the modification of f_code arrays and motion vectors at the point of reception.

The actual stitching process, after having modified all the f_code arrays and having reencoded all the motion vectors for all the (slices of the) frames of the videos to be stitched together, is now described.

In MPEG, a single row of macroblocks is encoded as a sequence of one or more MPEG "slices", where a slice is a row of macroblocks (one macroblock high, and one or more macroblocks wide). In a single MPEG video frame, these slices are encoded from top to bottom.

The first task to compose a full-screen frame from multiple separately encoded smaller frames is to produce the screen-wide rows of macroblocks. Simply appending the slices from the different encoded frames for each such row in a left to right order is already sufficient. The only extra work that has to be done for each slice is setting the macroblock_address_increment value in the first macroblock to indicate the horizontal starting position of the slice in the macroblock row.

Having composed all the individual screen-wide macroblock rows, the next step is composing these rows into a full frame. This can be done by appending the rows in a top to bottom order. The only extra work that has to be done is adjusting the slice slice_vertical_position value in each slice to indicate how far down the screen from the top the slice goes in the final stitched frame.

It is important to consider that, although it is perfectly legal MPEG to have multiple slices per screen-wide row of macroblocks, some decoders have problems with more than 1 slice per macroblock row since this is not common practice in the industry. It is safer to concatenate two or more slices into a single full-width slice. Slice-concatenation according to the illustrative embodiment is described by the following 6 step process.

1. All but the first of the slices being concatenated must have their slice header removed.

2. The first macroblock of a slice to be appended to a previous slice may need a macroblock_address_increment adjustment to indicate how many macroblocks have been skipped between the end of the slice to its left and the current macroblock. When there is no gap (as is usually the case), this value will need no change.

3. If there is a difference between the quantiser_scale_code in use at the end of a slice and that declared in the excised slice header on the following slice, the first macroblock of that following slice will need to contain the correct quantiser_scale_code, indicated by setting the macroblock_quant_flag in the macroblock, followed by the appropriate quantiser_scale_code.

4. The predicted motion vectors at the beginning of a slice following a previous slice must be updated. At the beginning of a slice, motion vectors are predicted to be zero, and so the first motion vectors encoded for a macroblock represent absolute values. But subsequent macroblocks derive their motion vectors as deltas from those of the macroblock to their immediate left. Forward and reverse motion vectors are tracked separately, and in the event that macroblocks are skipped within the slice, predictions may revert to zero. The exact rules about how skipped macroblocks affect predictions differ between P and B frames and field and frame pictures. In. any event, one or more macroblocks at or near the beginning of a slice to be appended to a previous slice most likely need to be modified to take into account motion vector predictions inherited from the previous slice. Once inherited correctly, macroblocks farther to the right need not be modified.

5. The "dct_dc_differential" values found in the first macroblock of an appended slice must be modified to reflect inheritance of predicted dc levels front the last macroblock of the slice onto which the appending operation is being performed. Normally slices start out with known fixed dc level assumptions in the first macroblock, and inherit dc levels, with modification by dct_dc_differential values, from left to right. Modification of the dct_dc_differential value is required at the start of an appended slice because it must base its dc calculation on inheritance from the macroblock to its left instead of being based on initial fixed values.

6. The stop code for a slice is a run of 23 zero bits. These stop bits have to be removed for all but the last appended slice on a screen row of macroblocks, FIG. 6 illustrates the stitching of video segments and merging of slices. Step 7 illustrates the concatenation of slices for single rows of macroblocks as well as concatenation of such rows into a full-screen picture. Step 8 illustrates the subsequent merging of multiple slices for one screen-wide macroblock row into a single slice.

The final data fields that have to be determined for a complete frame that has thus been stitched together are the vertical_size_value, bit_rate_value, and vbv_buffer_size_value, all in the MPEG sequence header, as well as the vbv_delay field in the MPEG picture header.

The value for vertical_size_value is simply the height of the stitched frame and is hence easy to modify. However, in the case of CBR (Constant BitRate) MPEG video, to obtain legal values for bit_rate_value, vbv_buffer_size_value, and vbv_delay requires additional work. It is generally necessary to add varying amounts of padding between frames of video while appending all frames together, in order to ensure that the video has constant bitrate and satisfies the rules for the CBR video buffer verification (VBV) model that govern the legal playability of MPEG video. Only after this padding is complete, the values for bit_rate_value, vbv_buffer_ size_value, and vbv_delay can be filled in for each frame, step 9. This will be described further in the separate section below.

In the case of VBR (Variable BitRate) MPEG video, padding is not strictly necessary. Instead, the system can recalculate the peak (maximum) bitrate of the stream (which might have changed due to the f_code and motion vector adaptation), and fill in this value in the bit_rate_value fields of the video. The vbv_delay fields have a constant, fixed, value in the case of VBR video, and the value for vbv_buffer_size can simple be chosen as the maximum allowed VBV buffer size for the particular profile and level of the MPEG video (e.g., 224 Kbyte for Main Profile/Main Level MPEG video)

As mentioned previously, macroblock data tends to slightly expand to reflect the necessary f_code value changes during stitching, causing an increase in required bandwidth. Conversely, when streams are stitched together, sequence, GOP, and picture header information from all but one of them is stripped off to leave just the slices of macroblocks, causing a slight decrease in required bandwidth.

The net effect of f_code-related expansion and header-stripping contraction usually ends up with a net expansion of raw data to be transmitted. This data expansion will be unevenly distributed, since some frames in the stream will be expanded more than others. Therefore, in order to maintain, constant bitrate (CBR) and satisfy the associated VBV buffer models, the new video data must be properly distributed, and this can be achieved by adding padding bytes between frames of video.

The most straightforward way to pad for VBV legality and constant bitrate is to measure the size of each original frame of video and the stitched frame produced by their concatenation with f_code adjustment as follows.

Let S(n,f) be the size in bytes of frame f of video segment n, where there are N segments (0, . . . , N−1) that are being stitched together and F frames of video (0, . . . , F) in each segment. S(f) be the size in bytes of frame f of stitched-together video (after f_code motion vector adjustment and the discarding of headers from all but one of the stitched frames)

Then $$E(f)=S9f)/(S(0,f)+S91,f)+ \ldots +S(N-1,f))$$

is the expansion ratio of frame f of stitched video. Now, let E max be the maximum of all values E(0), . . . E(F−1), i.e., the maximum expansion ratio across all F frames. Practice has shown that a typical value is around 1.1 (a 10% expansion). By padding all stitched frames (except the one(s) that have this maximum expansion rate) with an appropriate number of zero-bytes it is possible to make E(f) the same as this maximum value E max for each video frame. Now, furthermore assuming that the initial frame VBV delay times were equal in the original separately encoded clips (which is easy to accomplish with existing encoders) we can define:

$$VBV \max=(VBV(0)+VBV(1)+ \ldots +VBV(N))*E \max$$

where

VBV(n) is the VBV buffer size used to encode segment n, and

VBV max is the VBV buffer size in which the stitched video is guaranteed to run

Padding to a maximum expansion rate as just described is a simple way of guaranteeing a certain VBV buffer size for the resultant video. Keeping VBV max below the MPEG defined max. VBV buffer size (e.g., 224 Kbyte for MPEG-2 Main Profile/Main Level, or MP@ML) will guarantee legal video that any decoder will be able to decode.

One issue with the just described simple padding algorithm is that it can result in significant (10% or so) expansion of the final stitched video, which can be wasteful. In case the expansion is already done before transmission it will also lead to extra bandwidth consumption.

However, a person skilled in the art can see that it is possible to construct more intelligent variations of this worst-case padding algorithm which reduce the wasted bandwidth and VBV buffer growth by removing or relocating sections of padding in such a way that buffer models are not violated.

After the padding of each frame is complete, the values for bit_rate_value, vbv_buffer_size_value, and vbv_delay can finally be computed and filled in the sequence and picture headers for each frame, thus solving the last required action to complete the stitching process.

Step 9 in FIG. 6 illustrates the final step of padding between frames to achieve the final VBV buffer size for the stitched video sequence in the case of CBR video.

Although the invention has been shown and described with respect to illustrative embodiments thereof, various other changes, omissions and additions in the form and detail thereof may be made therein without departing from the spirit and scope of the invention.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method comprising:
   receiving encoded video segments;
   associating the encoded video segments with one or more previously determined regions, wherein the one or more regions are rectangular regions that do not overlap, and wherein each of the one or more regions is associated with a display area of a video display device;
   decoding the received video segments associated with the one or more regions to generate partial-frame video segments;
   stitching the partial-frame video segments to generate a full-video frame video segment;
   padding the full-video frame video segment with data; and
   appending one or more full-video frame video segments to the padded full-video frame video segment to generate a video.

2. The method of claim 1, wherein the video comprises an advertisement.

3. The method of claim 1, further comprising:
   determining a target video buffer verification buffer size for the video; and
   determining, based on the target video buffer verification buffer size, a number of zero or more zero-bytes to append to the full-video frame video segment.

4. The method of claim 1, wherein the video has a variable bit rate, and further comprising: determining, based on a maximum bit rate of the received video segments, a bit rate of the video.

5. The method of claim 1, further comprising:
   determining a constant bit rate of the video; and
   determining, based on the constant bit rate of the video, the data for padding the full video frame video segment.

6. The method of claim 1, wherein the encoded video segments use a common GOP pattern.

7. A method comprising:
generating one or more full-video frame video segments, the generating comprising:
receiving encoded video segments;
associating the encoded video segments with one or more previously determined regions, wherein the one or more regions are rectangular regions that do not overlap, and wherein each of the one or more regions is associated with a display area of a video display device;
decoding the received video segments associated with the one or more regions to generate partial-frame video segments; and
stitching together the partial-frame video segments to generate a full-video frame video segment;
appending zero-bytes to each of the one or more full-video frame video segments; and
appending together the one or more full-video frame video segments.

8. The method of claim 7, wherein the regions are rectangular.

9. The method of claim 7, wherein the full-video frame video segments are associated with an advertisement.

10. The method of claim 7, further comprising:
determining, based on a maximum bit rate of the received video segments, a bit rate of the appended one or more full-video frame video segments.

11. The method of claim 7, further comprising:
determining a constant bit rate of the appended one or more full-video frame video segments; and
determining, based on the constant bit rate, a number of the zero or more zero-bytes to append.

12. An apparatus comprising:
one or more processors; and
a memory storing computer executable instructions that, when executed by the one or more processors, cause the apparatus to:
receive encoded video segments;
associate the encoded video segments with one or more previously determined regions, wherein the one or more regions are rectangular regions that do not overlap, and wherein each of the one or more regions is associated with a display area of a video display device;
decode the received video segments associated with the one or more regions to generate partial-frame video segments;
merge the partial-frame video segments to generate a full-video frame video segment;
pad the full-video frame video segment with zero or more zero-bytes; and
append one or more full-video frame video segments to the padded full-video frame video segment to generate a video.

13. The apparatus of claim 12, wherein the video comprises a regionally-customized advertisement.

14. The apparatus of claim 12, wherein each of the one or more regions comprise a length that is a multiple of sixteen pixels and a width that is a multiple of sixteen pixels.

15. The apparatus of claim 12, the executable instructions that, when executed by the one or more processors, further cause the apparatus to:
determine a bit rate of the video; and
determine, based on the bit rate of the video, a number of the zero or more zero-bytes to pad the full-video frame video segment with.

16. The apparatus of claim 12, wherein the one or more regions comprise at least one invariant region and at least one variant region; and
wherein the received video segments comprise:
an invariant video segment for each of the at least one invariant region; and
a variant video segment for each of the at least one variant region.

17. The method of claim 7, wherein the encoded video segments use a common GOP pattern.

18. The apparatus of claim 12, wherein the encoded video segments use a common GOP pattern.

* * * * *